May 5, 1959 R. W. JENSEN 2,884,905
ALTITUDE RESPONSIVE PNEUMATIC ACTUATOR
Filed Dec. 2, 1955
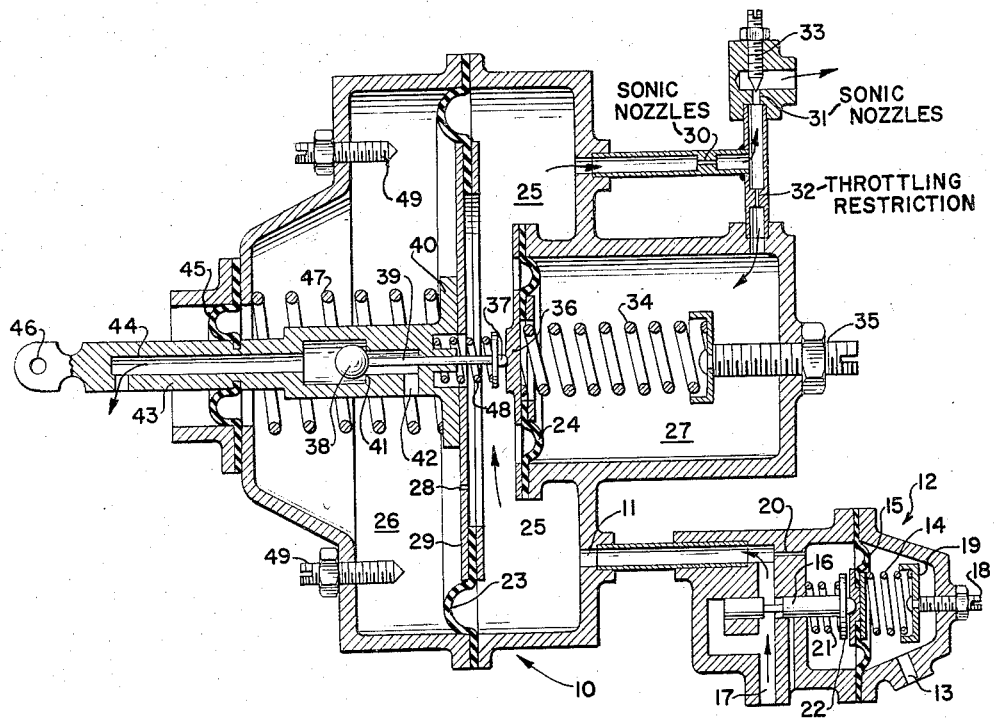
RAYMOND W. JENSEN,
INVENTOR.
BY John H. J. Wallace

United States Patent Office

2,884,905
Patented May 5, 1959

2,884,905

ALTITUDE RESPONSIVE PNEUMATIC ACTUATOR

Raymond W. Jensen, Phoenix, Ariz., assignor to The Garrett Corporation, Los Angeles, Calif., a corporation of California Application December 2, 1955, Serial No. 550,579

17 Claims. (Cl. 121—41)

This invention relates to an altitude responsive pneumatic actuator, and more particularly to an actuator having a novel combination of pressure dividers in series, with a pressure regulator which senses ambient atmosphere, whereby the actuator automatically varies its position in proportion to variations in altitude of an aircraft or other vehicle on which the actuator is carried.

Some conventional pneumatic actuators have altitude responsive devices which include an evacuated or semi-evacuated bellows. Bellows, when used in altitude responsive devices, are subject to a variety of conditions which may affect accuracy thereof. Difficulties encountered in the use of bellows for altitude response include effects of temperature change, or extreme temperatures acting upon the material of the bellows. In addition, leakage and damage to the bellows from any cause whatever can permanently affect the operation of an actuator or device in which bellows are used.

A Bourbon tube is commonly used to obtain altitude responses; however, such a device is subject to most of the objections to the use of bellows.

Another device commonly used to obtain altitude response includes a diaphragm or bellows preloaded with a spring and acted upon by a control pressure. The spring rate of such a device, however, does not permit such a constant proportional movement throughout its actuating range as may be required to obtain a response or position which corresponds accurately with altitude changes or conditions.

It is an object of the present invention, therefore, to provide an altitude positioned pneumatic actuator which will operate properly and accurately at all times, corresponding to altitude changes or conditions accompanying the use of the actuator.

Another object of the present invention is to provide an altitude positioned pneumatic actuator which is highly sensitive and accurate in operation.

Still another object of the present invention is to provide a novel combination of an inlet pressure regulator and an outlet pressure divider, operably associated with a movable actuating control means to position an actuator arm.

Further objects and advantages of this invention will appear from the following specification, appended claims, and the accompanying drawing, in which the figure thereof is a sectional view showing, diagrammatically, a pneumatic actuator embodying the principles of the present invention.

The figure of the drawing discloses a pneumatic actuator having a casing 10 provided with an inlet opening 11. At the inlet opening of the casing 10 is a pressure regulator 12 having an opening 13, which communicates with atmospheric pressure, which is utilized as an altitude pressure reference. In the regulator, a spring 14 engages a diaphragm 15 on the side thereof which senses atmospheric pressure through the opening 13. A valve element 16 is operable by the diaphragm 15 and is arranged to control flow through an inlet opening 17 of the pressure regulator 12. This opening 17 is connected to a source which provides a supply of pressure to the valve element 16, source pressure and volume being sufficient at all times for the operation of the actuator. The outlet side of the valve element 16 communicates with the casing inlet 11 and the valve is movable to control pressure of fluid delivered to the inlet 11. An adjustment screw 18 is engaged with a plate 19 at the end of the spring 14 for adjusting the spring and consequently the outlet pressure of the regulator 12. An orifice 20 admits regulated pressure at the outlet of the valve element 16 to the side of the diaphragm 15 opposite to the spring 14. A light spring 21 engages a shoulder 22 on the valve element 16 and tends to hold it engaged with the diaphragm 15 for movement therewith.

The pressure regulator 12, communicating with atmosphere at one side of its pressure regulating diaphragm 15, is capable of varying its output pressure according to changes in atmospheric pressure, which varies according to altitude. Thus, the output of the pressure regulator 12 is delivered to the opening 11 of the casing 10 at a regulated level which is varied slightly with changing atmospheric pressure. It will be noted that the present actuator may be operated corresponding to pressure variations in an enclosure if desired.

Within the casing 10 are two diaphragms, 23 and 24, which separate the casing into three chambers, 25, 26 and 27. The chamber 25, communicating with the opening 11, also communicates with an orifice 28 in a plate 29 carried by the diaphragm 23. The orifice 28 establishes restricted communication between the chambers 25 and 26. Also communicating with the chamber 25 is a passage containing a pair of spaced sonic orifices 30 and 31. A throttling restriction or orifice 32 establishes limited communication between the space in the passage intermediate the orifices 31 and 32, and the chamber 27. The sonic orifice 31 is provided with an adjustable needle valve element 33 for varying the flow area of the sonic orifice 31. This needle valve 33 is utilized for purposes of calibration in order to attain a desired absolute pressure in the chamber 27. It will be understood that the sonic orifices 30 and 31 are choked orifices, in which a sonic flow condition exists, and that the orifice 31 exhausts to atmosphere. These orifices in series are commonly known as pressure dividers. The orifice 32 is utilized only for the purpose of preventing a rapid pressure change in the chamber 27 when an extremely rapid change of altitude is sensed by the pressure regulator 12, which causes a corresponding change of pressure in the chamber 25 which communicates with the flow dividers.

Positioned in the chamber 27 is a spring 34 which engages the diaphragm 24 and tends to force it toward the chamber 25 for opposing pressure therein. An adjustment screw 35, threaded into the casing 10 at one end of the chamber 27, is arranged to provide adjustment of the compressive loading of the spring 34 against the diaphragm 24. The diaphragm 24 is provided with a central plate 36, which engages a stem 37 of a spherical pilot valve 38, the shank 39 of which projects through a central fitting 40 in sealed connection with the diaphragm 23.

The central fitting 40 is provided with a seat 41 cooperable with the spherical pilot valve element 38. The fitting 40 is also provided with a port 42 which intercommunicates with the pilot valve 38 and the chamber 26. In addition, the fitting 40 is provided with a rod-like element 43, having a bore 44 therein which intercommunicates with the pilot valve element 38 and atmospheric pressure. A diaphragm 45 surrounds the rod portion 43 and provides a seal which is connected to the rod 43 and casing 10 to form a flexible closure for an opening in the side wall of the chamber 26 through which the rod 43 extends. The rod 43 is provided with a clevis portion 46, to which may be connected a variable area nozzle for a turbine, or any other device requiring positioning in accordance with variations in altitude or changes in pressure. A spring 47 tends to retract the rod 43 into the casing 10 and to force the diaphragm 23 toward the chamber 25. Another spring 48 surrounds the stem 39 of the pilot valve 38 and tends to force the end 37 of the stem thereof toward the plate 36 carried by the diaphragm 24. The stroke of the rod 43 and diaphragm 23 from sea level to a predetermined altitude is determined as follows:

The spring 34 is first adjusted to balance pressure in the chamber 25 when the regulator 12, at its opening 13 communicates with atmospheric pressure at sea level. This adjustment predetermines the position of the pilot valve 38 and the position of the rod 43 at sea level. The stop screws 49 are then adjusted to a position of the diaphragm 23 corresponding to the desired limit of its travel when the actuator is subjected to the atmospheric pressure of the maximum altitude at which it will be used.

Operation of the altitude positioned pneumatic actuator of the present invention is as follows:

As shown in the drawing, pressure enters the pressure regulator 12 from an external source communicating with the inlet opening 17, and this pressure is reduced to a desired level above atmospheric pressure by means of the valve element 16, diaphragm 15, and the adjustable spring 14 within the regulator 12. Regulated pressure from the regulator 12 is conducted to the chamber 25 from which pressure passes into the chamber 26 through the orifice 28. Regulated pressure communicating with the chamber 25 is also conducted into the pressure divider orifices 30 and 31.

A choked orifice, as referred to herein, is one in which fluid flow is at sonic velocity. Control pressure, as referred to herein, is the pressure between the orifices 30 and 31 and in chamber 27. Regulated pressure, as referred to herein, is that delivered from the output of the pressure regulator 12 which utilizes atmospheric pressure as a reference medium.

Flow through thhe orifices 30 and 31 causes a choked condition thereof. The ratio of regulated pressure in the chamber 25 relative to control pressure in the chamber 27 will then remain constant throughout a range of atmospheric pressure sensed by the diaphragm 15, and at the outlet of the flow divider orifice 31.

Pressure in the chamber 27 is adjustable by changing the size of the downstream orifice 31 which exhausts to atmosphere. Adjustment of this orifice 31 causes a corresponding change of the pressure differential across the diaphragm 24. Control pressure conducted into chamber 27 through the orifice 32 creates a pressure differential across the diaphragm 24. When the device of the present invention is in an aircraft which ascends, the pressure regulator 12, which communicates with atmospheric pressure through the opening 13, correspondingly decreases pressure in the chamber 25, while the orifices 30 and 31 hold a constant pressure ratio between regulated pressure in the chamber 25 and control pressure in the chamber 27. Thus, the pressure ratio across the diaphragm 24 is maintained constant throughout a range of altitude traversed by an aircraft carrying the actuator of the present invention.

Assuming that the orifice 31 is adjusted to maintain a pressure ratio of 1.25:1 across the diaphragm 24, the following pressure changes with respect to altitude may occur. For example, when absolute pressure in the chamber 25 is regulated to 24 p.s.i. at sea level, a corresponding pressure in the chamber 27 would be 19.2 p.s.i., which would equal a pressure differential of 4.8 p.s.i. across the diaphragm 24. An increase in altitude which would cause the regulator 12 to decrease the regulated pressure in the chamber 25 to 20 p.s.i. absolute, would cause a corresponding absolute pressure of 16 p.s.i. in the chamber 27. A corresponding pressure differential across the diaphragm 24 would then be 4 p.s.i. This decreased pressure differential causes the diaphragm 24 to move toward the diaphragm 23, as will be hereinafter described in detail. It will, therefore, be understood that while the regulator 12 communicates with atmospheric pressure, and the orifice 31 exhausts to atmosphere, a constant pressure ratio is maintained across the diaphragm 24. In addition, it will be understood that a change in absolute pressure in the chamber 25 will cause a pressure differential change across the diaphragm 24, due to the fact that the pressure ratio thereacross is maintained constant.

As the pressure differential across the diaphragm 24 is decreased, the force of the spring 34 assists to move the diaphragm 24 toward the diaphragm 23, thus forcing the pilot valve element 38 in a direction away from its seat 41, which is in the fitting 40 carried by the diaphragm. This action increases flow of air from the chamber 26 through the port 42 and bore 44 to atmosphere beyond the flow capacity of the orifice 28 in diaphragm plate 29, causing a differential pressure between the chambers 25 and 26. The diaphragm 23 and actuator rod 43 then move the pilot valve seat 41 toward the pilot valve 38 to seek and establish a position in which the forces exerted by fluid pressure and spring 47 on the diaphragm 23 are balanced. The actuator, while in a balanced condition, will counteract force applied directly to the actuator arm rod 43. This is accomplished by feedback operation of the pilot valve 38 and its cooperative relation with the orifice 28. Similar positioning and feedback mechanism is disclosed in my co-pending application Serial No. 532,-206, filed September 2, 1955.

It will be understood that the inlet pressure regulator 12, chamber 25, flow dividers 30 and 31, chamber 27 and the diaphragm 24 constitute an altitude responsive device which may be used as an actuator per se, or as a control mechanism on the presently disclosed actuator, including the diaphragm 23 and the rod 43, or upon actuators such as disclosed in the application referred to above.

The present invention, for example, may be used to operate variable area nozzles of a turbine in order to maintain a substantially constant pressure ratio thereacross, while altitude of an aircraft, carrying the turbine changes. Since the speed of a turbine is predicated upon the pressure ratio from its inlet to its outlet, and since most turbines exhaust to atmosphere, it is necessary to adjust the variable area nozzles of turbines corresponding to a change in ambient pressure when such turbines are to be operated at constant speed and at varying altitudes. The present altitude positioned actuator is capable of automatically adjusting variable area nozzles of a turbine, in order to prevent overspeeding of the turbine as it is carried to higher altitudes during its operation in an airplane. Reference is made to the element 43, which is connectable to a variable area nozzle mechanism of a turbine. This element may be connected to other devices requiring positioning according to altitude, if desired.

I claim:

1. In a fluid pressure positioned pneumatic actuator: a casing having a fluid pressure receiving inlet and a fluid pressure relieving outlet; a fluid pressure regulator having a regulating element employing fluid pressure surrounding said casing as a reference, said pressure regulator controlling pressure of flow through said inlet opening and into said casing; a pressure divider having a pair of orifices in series disposed to control relief flow from said casing through said outlet; a movable actuating control means mounted within said casing and disposed to sense a pressure differential between pressure at said inlet and pressure between said orifices; and at actuator operated by said actuating control means.

2. In an altitude positioned pneumatic actuator: a casing having a fluid pressure receiving inlet and a fluid pressure relieving outlet; a fluid pressure regulator having a regulating element employing ambient atmospheric pressure as a reference, said pressure regulator controlling pressure of flow through said inlet opening and into said casing; a pressure divider having a pair of orifices in series disposed to control relief flow from said casing through said outlet; means forming a movable pilot valve and actuator mounted within said casing and disposed to sense a pressure differential between pressure at said inlet and pressure between said orifices; and a pneumatic actuator cooperable with said pilot valve and actuating means.

3. In an altitude positioned pneumatic actuator: a casing having a fluid pressure receiving inlet and a fluid pressure relieving outlet; a fluid pressure regulator having a regulating element employing ambient pressure as a reference, said pressure regulator controlling pressure of flow through said inlet opening and into said casing; a pressure divider having a pair of orifices in series disposed to control relief flow from said casing through said outlet; a movable wall means mounted within said casing and disposed to sense a pressure differential between pressure at said inlet and pressure between said orifices; and an actuator operable by said movable wall.

4. In an altitude positioned pneumatic actuator: a casing having a fluid pressure receiving inlet and a fluid pressure relieving outlet; a fluid pressure regulator having a regulating element employing ambient pressure as a reference, said pressure regulator controlling pressure of flow through said inlet opening and into said casing; a pressure divider having a pair of orifices in series disposed to control relief flow from said casing through said outlet; means forming a movable pilot valve and wall element mounted within said casing and disposed to sense a pressure differential between pressure at said inlet and pressure between said orifices; and a pneumatic actuator having a pneumatically responsive movable wall means controlled by the pilot valve of said first mentioned means.

5. In an altitude positioned pneumatic actuator: a casing having a fluid pressure receiving inlet and a fluid pressure relieving outlet; a pressure regulator controlling pressure of flow through said inlet opening and into said casing; a pressure divider communicating with said outlet and having a pair of orifices in series, said orifices being arranged to maintain a constant pressure ratio between pressure in said inlet and pressure between said orifices; a movable control means mounted within said casing and disposed to sense a pressure differential between pressure at said inlet and pressure between said orifices; and an actuator controlled by said control means.

6. In an altitude positioned pneumatic actuator: a casing having a fluid pressure receiving inlet and a fluid pressure relieving outlet; a fluid pressure regulator having a regulating element employing ambient pressure as a reference, said pressure regulator controlling pressure of flow through said inlet opening and into said casing; a pressure divider having a pair of orifices in series disposed to control relief of flow from said casing through said outlet; first and second movable walls in said casing and separating the same into a plurality of chambers, one chamber being disposed between said movable walls and communicating with said inlet and outlet, another chamber communicating with pressure between said orifices, said first movable wall communicating with the last mentioned chamber and having pilot valve means operably associated with said second movable wall for varying the pressure differential thereacross, said last mentioned movable wall having an actuator member connected therewith.

7. In an altitude positioned pneumatic actuator: a casing having a fluid pressure receiving inlet and a fluid pressure relieving outlet; a fluid pressure regulator having a regulating element employing ambient pressure as a reference, said pressure regulator controlling pressure of flow through said inlet opening and into said casing; a pressure divider having a pair of orifices in series disposed to control relief of flow from said casing through said outlet; first and second movable walls in said casing and separating the same into a plurality of chambers, the first of said chambers being disposed between said movable walls and communicating with said inlet and outlet, the second of said chambers communicating with pressure between said orifices, said first movable wall forming a wall of said second chamber; a pilot valve element operable by said first movable wall; a second pilot valve element cooperable with said first pilot valve element and operated by said second movable wall; and an orifice communicating with opposite sides of said second movable wall, the third of said chambers communicating with said orifice and said pilot valve elements, said third chamber being disposed at the opposite side of said second movable wall from said first chamber, said pilot valve elements communicating with ambient pressure.

8. In a fluid pressure positioned pneumatic actuator: a casing having a fluid pressure receiving inlet and a fluid pressure relieving outlet; a fluid pressure regulator having a regulating element employing fluid pressure surrounding said casing as a reference, said pressure regulator controlling pressure of flow through said inlet opening and into said casing; a pressure divider having a pair of orifices in series disposed to control relief flow from said casing through said outlet; and a movable actuating device mounted within said casing and disposed to sense a pressure differential between pressure at said inlet and pressure between said orifices.

9. In a fluid pressure responsive actuator: means forming a chamber with first and second relatively movable walls at opposite sides thereof, said chamber having an inlet and an outlet; means communicating with said chamber inlet to admit fluid under pressure thereto, said means being responsive to variations in ambient pressure to proportionally change the pressure admitted to said chamber; means communicating with the outlet of said chamber and operating to maintain a predetermined pressure ratio at the opposite sides of said of said first movable wall, variation of pressure in said chamber causing relative movement of said walls; pilot valve means responsive to relative movement between said walls to create pressure differences at opposite sides of said second movable wall to cause movement of the latter wall; and motion transmitting means operatively engaged with said second movable wall and projecting from said chamber forming means.

10. In a fluid pressure responsive actuator: means forming a chamber with first and second relatively movable walls at opposite sides thereof, said chamber having an inlet and an outlet; means communicating with said chamber inlet to admit fluid under pressure thereto, said means being responsive to variations in ambient pressure to proportionally change the pressure admitted to said chamber; means communicating with the outlet of said chamber and operating to maintain a predetermined ratio between the pressures at opposite sides of said first movable wall, variations of pressure in said chamber causing movement of said first movable wall; pilot valve means responsive in part to movement of said first movable wall to cause pressure differences at opposite sides of said second movable wall and movement thereof in response to such pressure differences; and motion transmitting means operatively engaged with said second movable wall and projecting from said chamber forming means.

11. In a fluid pressure responsive actuator: means forming a chamber with first and second relatively movable walls at opposite sides thereof, said chamber having an inlet and an outlet; regulator means communicating with said chamber inlet to admit fluid under pressure thereto, said means being responsive to variations in ambient pressure to proportionally change the pressure admitted to said chamber; means communicating with the outlet of said chamber and operating to maintain a predetermined ratio between the pressures at opposite sides of said first movable wall, changes in pressure in said chamber causing movement of said first movable wall; cooperative valve elements carried by said walls and responsive to relative movement thereof to cause pressure differences at opposite sides of said second movable wall and movement thereof in response to such pressure differences; and motion transmitting means operatively engaged with said second movable wall and projecting from said chamber.

12. In a fluid pressure responsive actuator: means forming a chamber with first and second relatively movable walls at opposite sides thereof, said chamber having an inlet and an outlet; regulator means communicating with said chamber inlet to admit fluid under pressure thereto, said means being responsive to variations in ambient pressure to proportionally change the pressure admitted to said chamber; means communicating with the outlet of said chamber and operating to maintain a predetermined ratio between the pressures at opposite sides of said first movable wall, a reduction in pressure in said chamber causing said first wall to move in a predetermined direction; cooperative valve means carried by said walls, said valve means being responsive to movement of said first wall to cause pressure differences at opposite sides of said second movable wall, such pressure differences causing said second movable wall to move in the same direction as said first wall; and motion transmitting means operatively engaged with said second movable wall and projecting from said chamber.

13. In a fluid pressure responsive actuator: a casing having inlet and outlet ports; movable wall means disposed in said casing to divide the interior thereof into first, second and third chambers, the first chamber being located between said wall means and communicating with said inlet and outlet ports, said first and second chambers being in restricted communication; regulator means responsive to ambient atmospheric pressure to control the pressure of fluid admitted from a source to said inlet port; a plurality of orifices disposed in spaced order in said outlet, said third chamber communicating with the space between said orifices to receive fluid at a predetermined pressure ratio to that in said first chamber; pilot valve means responsive to relative movement between said movable wall means to control fluid flow from said second chamber and movement of a portion of said wall means; and a motion-transmitting element operatively engaged with said portion of said wall means and projecting from said casing.

14. In a fluid pressure responsive actuator: means forming a casing divided by movable walls into first, second and third chambers, the first chamber having an inlet for receiving fluid under pressure and an outlet, said first and second chambers being in restricted communication, the latter chamber having an outlet; resilient means tending to move said movable walls toward said first chamber; means in the outlet leading from said first chamber to cause a predetermined pressure differential in fluid flowing therefrom, said third chamber receiving fluid at the lower pressure; pilot valve means responsive to relative movement between the walls at opposite sides of said first chamber to control fluid flow from the outlet of said second chamber and pressure differences in said first and second chambers; motion transmitting means operatively engaged with the wall between said first and second chambers and projecting from said casing; and regulator means between said inlet and a fluid pressure source, said regulator means being responsive to variations in ambient pressures to proportionally change the pressure admitted to said first chamber.

15. In a fluid pressure responsive actuator; a casing having an inlet for communication with a source of pressure fluid and an outlet; movable wall means disposed in said casing to divide the interior thereof into first, second and third chambers, the first chamber being located between said wall means and communicating with said inlet and outlet, said first and second chambers being in restricted communication; a plurality of orifices disposed in spaced order in said outlet, said third chamber communicating with the space between said orifices to receive fluid at a predetermined pressure ratio to that in said first chamber; pilot valve means responsive to relative movement between said movable wall means to control fluid pressure in said second chamber and movement of a portion of said wall means; motion transmitting means operatively engaged with said portion of said wall means and projecting from said casing; and regulator means between said inlet and a fluid pressure source, said regulator means varying the pressure admitted to said first chamber in response to changes in ambient pressure.

16. In a pressure responsive actuator: means forming a hollow casing divided by first and second relatively movable walls into first, second and third chambers, the first chamber being disposed between said walls and having inlet and outlet ports, said first and second chambers being in restricted communication, the second chamber having an outlet; valve means for controlling fluid flow from said second chamber through the outlet therefrom, said valve means being operated by relative movement of said walls; resilient means tending to move said walls in a direction to open said valve, an increase in fluid pressure in said first chamber tending to move said walls and close said valve; means communicating with said first chamber inlet to admit fluid under pressure thereto, said means being responsive to variations in ambient pressure to proportionally change the pressure admitted to said first chamber; means communicating with the outlet of said first chamber to supply said third chamber with fluid at a predetermined pressure ratio to the fluid in said first chamber, variations in pressure in said first chamber changing the pressure differential on opposite sides of the movable wall between said first and third chambers and causing the actuation of said valve means to create pressure differences at opposite sides of the movable wall between said first and second chambers; and motion transmitting means operatively engaged with the last mentioned movable wall and projecting from said casing.

17. In a fluid pressure operated actuator: means forming a hollow casing; a movable wall element dividing the interior of said casing into first and second chambers having restricted communication with one another; a first means forming an inlet for admitting fluid pressure to said first chamber; a second means forming an outlet leading from said second chamber; valve means cooperating with said second means to control fluid flow through said outlet and create pressure differences at opposite sides of said wall element; a third means having a pressure responsive element operatively connected with said valve means to effect the actuation thereof, said pressure responsive element being exposed at least partially on one side to a pressure equal to that admitted to said first chamber; and a pressure divider having a pair of orifices in series to create a reduced fluid pressure bearing a predetermined ratio to that admitted to said first chamber, said reduced pressure being applied to the other side of the fluid pressure responsive element of said third means.

References Cited in the file of this patent
UNITED STATES PATENTS

| | | |
|---|---|---|
| 2,645,240 | Drake | July 14, 1953 |
| 2,775,231 | Silver | Dec. 25, 1956 |

UNITED STATES PATENT OFFICE
CERTIFICATE OF CORRECTION

Patent No. 2,884,905                                                  May 5, 1959

Raymond W. Jensen

It is hereby certified that error appears in the printed specification of the above numbered patent requiring correction and that the said Letters Patent should read as corrected below.

Column 1, line 33, for "Bourbon" read -- Bourdon --; column 3, line 43, for "thhe" read -- the --; column 4, line 73, for "at actuator" read -- an actuator --; column 6, line 42, strike out "of said", second occurrence.

Signed and sealed this 6th day of October 1959.

(SEAL)
Attest:

KARL H. AXLINE
Attesting Officer

ROBERT C. WATSON
Commissioner of Patents